H. O. BREAKER.
METHOD OF UTILIZING FUEL IN THE TREATMENT OF METALS.
APPLICATION FILED JULY 19, 1917.
1,304,258.
Patented May 20, 1919.
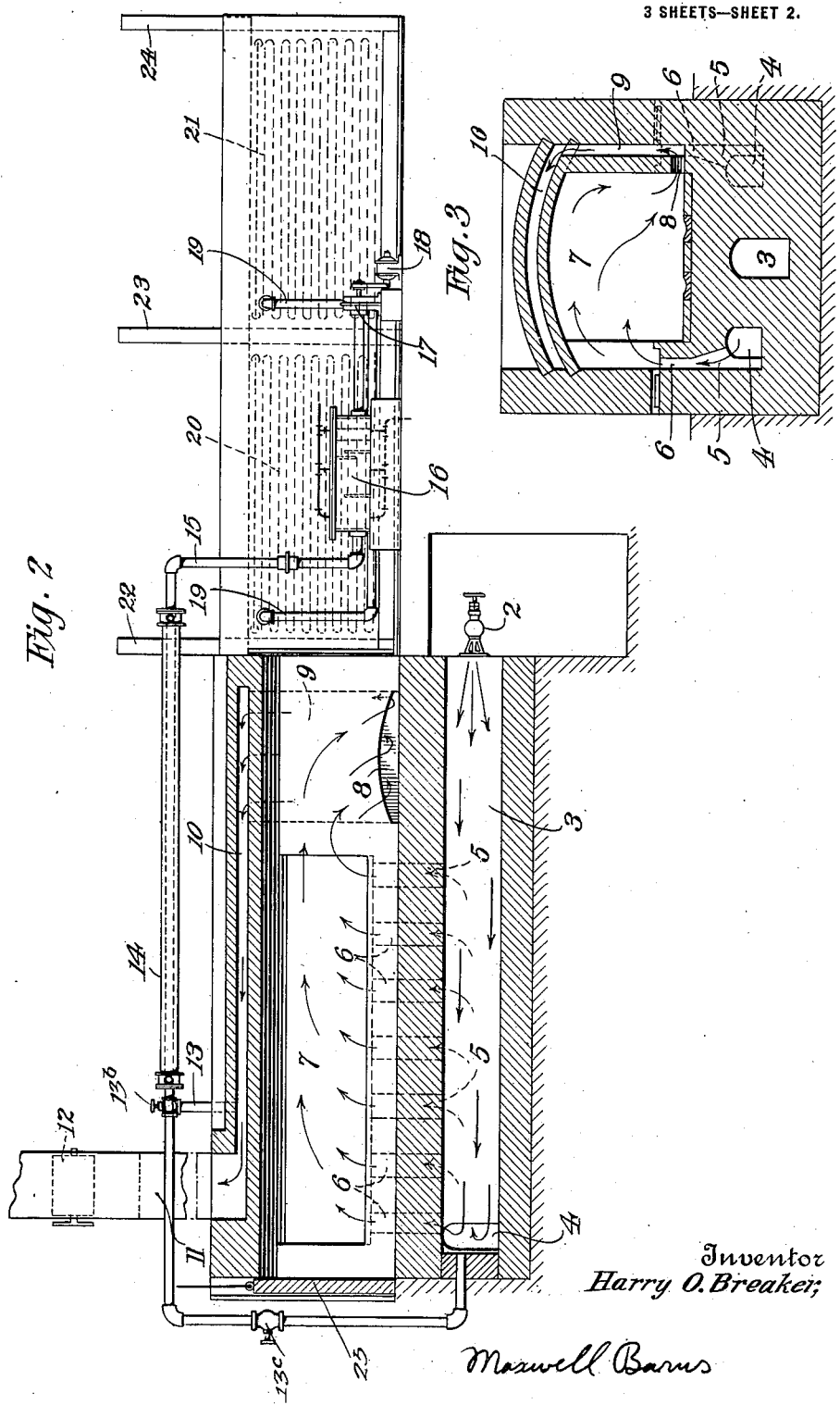
Inventor
Harry O. Breaker;
Maxwell Barns

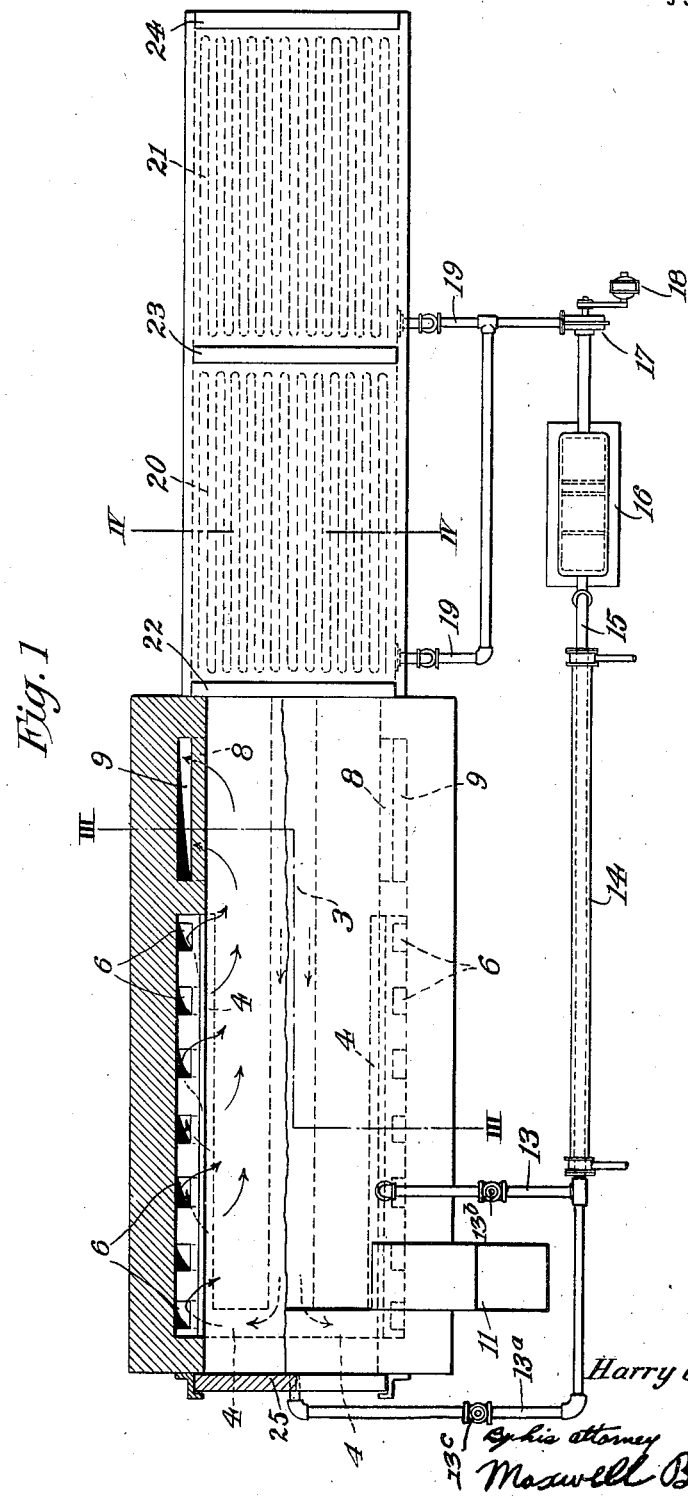

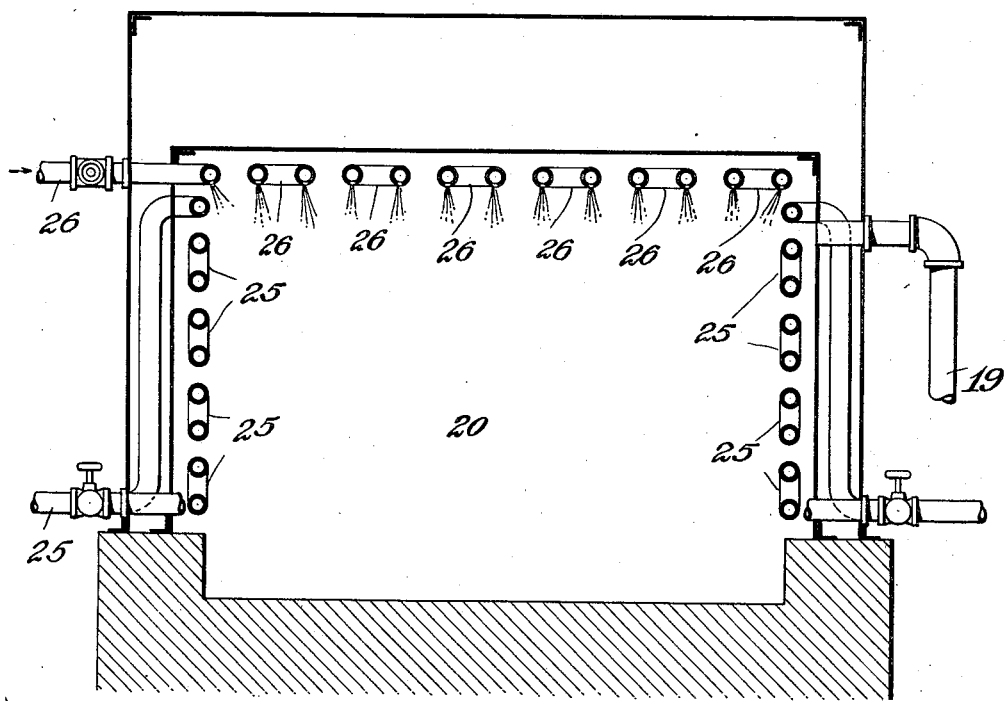

UNITED STATES PATENT OFFICE.

HARRY O. BREAKER, OF WINTHROP, MASSACHUSETTS, ASSIGNOR TO AMERICAN INCANDESCENT HEAT COMPANY, INC., OF BOSTON, MASSACHUSETTS, A CORPORATION OF MAINE.

METHOD OF UTILIZING FUEL IN THE TREATMENT OF METALS.

1,304,258.  Specification of Letters Patent.  Patented May 20, 1919.

Application filed July 19, 1917. Serial No. 181,592.

*To all whom it may concern:*

Be it known that I, HARRY O. BREAKER, a citizen of the United States, and a resident of Winthrop, Suffolk county, Massachusetts, have invented new and useful Improvements in Methods of Utilizing Fuel in the Treatment of Metals, of which the following is a full and complete specification.

In the treatment of metals it is well recognized that under many conditions it is highly desirable that the metal should not be oxidized during the time that it is being heated or during subsequent operations. Thus, in annealing, it is common to use muffle furnaces that are not directly open to the products of combustion during the heat treatment. Likewise, after the metal has been heated, it is sometimes withdrawn to a cooling chamber, in which a neutral atmosphere is provided. Heretofore this neutral atmosphere has demanded special preparation; for example, illuminating gas has been used or small fires have been kept burning in the chamber to consume any free oxygen that may be present. Both of these methods are open to objection, because of their cost, and the method of utilizing illuminating gas is dangerous, because of the chance for explosion, and the method of using separate fires is frequently inefficient. I have discovered that if the combustion of the fuel used for heating the metal in the first instance is properly controlled and conducted under proper conditions, a substantially non-oxidizing atmosphere can be obtained, which may be utilized both for the protection of the metal during the heating operation, and also during the subsequent treatments, such as the cooling of metal which is being annealed.

In furnaces of ordinary construction this can only be accomplished by admitting a relatively small amount of oxygen in the first instance, so that the fuel is very incompletely consumed with a great loss of efficiency. I have found, however, that my invention is particularly applicable to the form of furnace described in the patents issued to Alfred Smallwood, No. 1,226,266, dated May 15, 1917, and No. 1,226,267, dated May 15, 1917, and that with such a furnace it may be used to effect a considerable saving.

In the accompanying drawings is shown such a furnace provided with the necessary apparatus to utilize the combustion atmosphere in a cooling chamber. In these drawings, Figure 1 is a plan view, partly in section, of the furnace; Fig. 2 is a side elevation, partly in section, and Fig. 3 is a section on line III—III of Fig. 1. Fig. 4 is a section on IV IV of Fig. 1.

Referring to these drawings, 2 is an oil burner of any usual construction, at which initial combustion takes place. This combustion continues in the main combustion chamber 3, which runs the entire length of the furnace. From the main combustion chamber 3 the gases pass through the secondary or heat-distributing chambers 4, where combustion continues. From the heat-distributing chambers 4 the gases pass through ports 5 into passages 6, and thence into the working chamber 7. As shown in the drawings, the main combustion chamber and heat-distributing chambers constitute a combustion area of considerable length having a large surface. This surface becomes thoroughly heated and acts not only as a heat reservoir, but also as an aid in the complete combination of the oxygen and carbon admitted at the oil burner, so that it has been found that, when the products of combustion reach the farther end of the combustion chamber 3, substantially not more than one-half of 1 per cent. of free oxygen, and 1 per cent. of carbon monoxid, are present, thus showing that the combustion has been carried to a point of great efficiency.

The material to be treated is placed in the working chamber 7 through the door 25 in such form that it can be conveniently moved, as, for example, in pots. Here it is heated to an appropriate temperature by the hot gases of combustion and by the radiant heat which spreads from the combustion chambers up through the furnace to the working chamber. From the working chamber 7 the gases pass under counterarches 8 placed on each side of the working chamber, and thence through the passage 9 to the passage 10 in the top arch of the furnace. At the end of the passage 10 is a flue 11, which is equipped with a damper 12. Extending from the passage 10 a pipe 13 may be provided leading to a gas cooler or water-jacketed pipe 14. A pipe 13ᵃ may also be provided leading from the farther end of the combustion chamber 3 to the pipe 14. In the pipe 13 is a valve 13$^b$ and in the pipe 3$^a$ is a valve 13$^c$. The cooler or water-jacketed pipe 14 is connected by a pipe 15 to a washer 16, which may be of any ordinary construction. The products of combustion are drawn from the passage 10, through the pipe 13, valve 13$^c$ being closed and valve 13$^b$ being opened, or from the chamber 3 through the pipe 13$^a$, valve 13$^b$ being closed and valve 13$^c$ being opened to the washer 16 by a blower 17 driven by a motor 18. This blower sucks the gases through the washer and forces them through the pipes 19 into the cooling chambers 20 and 21, respectively. These cooling chambers 20 and 21 are equipped with water coils 25 so that their temperature may be controlled. In addition, they may be equipped with spray coils 26 adapted to spray water through the atmosphere and directly upon the work, when the material being treated is of such nature that it will not be injured by moisture, for example in treating copper.

As shown in Fig. 1, the cooling chamber 20 is connected directly to the working chamber 7 by the door 22, so that, after the material under treatment has been heated, it can be moved into the chamber 20 without the admission of outside air. Likewise, the chamber 20 may be connected with the chamber 21 by a door 23. A door 24 opens from the outside air into the chamber 21. By this arrangement the material under treatment is first partially cooled in the chamber 20, and then further cooled in the chamber 21 to the point where it can safely be withdrawn to the outside air. Although I prefer to use two cooling chambers 20 and 21, a single cooling chamber may be used if desired. In such case, the door 23 may be omitted. Long handled hooks may be conveniently used for moving the pots containing the material to be treated from the chambers 7 to 20 and 21, the doors 22, 23 and 24 being opened so far as is necessary for the purpose. In practice I find it advantageous to maintain a pressure slightly greater than atmospheric in the chambers 7, 20 and 21, in order to prevent oxygen from leaking in. This is accomplished by a proper adjustment of the damper 12 and by controlling the speed of the blower 17.

By utilizing the products of combustion in the manner described, great efficiency of operation is obtained, and a highly satisfactory cooling atmosphere is had, for the gas used in the cooling chambers is almost completely oxidized or burned, so that the atmosphere is substantially non-inflammable, but at the same time this atmosphere contains almost no free oxygen. A number of analyses of the gases withdrawn from the passage 10, and also of gases from the farther end of the chamber 3, show not more than one-half of 1 per cent. free oxygen, about 1 per cent. of carbon monoxid, and about 15½ per cent. of carbon dioxid.

As is well understood the use of a non-oxidizing atmosphere in a cooling chamber is of relatively greater importance for non-ferrous metals than for ferrous metals. Accordingly my invention is particularly adapted for use in connection with the former. However, I do not wish to limit myself to such use alone, as it is apparent that circumstances may arise which will make it desirable to utilize my invention in connection with ferrous metals.

The terms and expressions which I have employed are used as terms of description and not of limitation, and I have no intention, in the use of such terms and expressions of excluding any equivalents of the methods shown and described, or portions thereof, but recognize that various modifications are possible within the scope of the invention claimed.

What I claim is:

1. The method of utilizing fuel for annealing non-ferrous metals and similar purposes, which comprises the steps of burning the fuel, continuing the combustion under such conditions that substantially no free oxygen remains mixed with the products of combustion, heating the material under treatment in the products of combustion, and utilizing such products of combustion as an atmosphere in which to allow the material under treatment to cool in a cooling chamber into which the material under treatment may be moved while constantly surrounded by said products of combustion.

2. The method of utilizing fuel for annealing non-ferrous metals and similar purposes, which comprises the steps of burning the fuel, continuing the combustion under such conditions that substantially no free oxygen remains mixed with the products of combustion, heating the material under treatment in the products of combustion, and utilizing such products of combustion as an atmosphere in which to allow the material under treatment to cool in a cooling chamber into which the material under treatment may be moved while constantly surrounded by said products of combustion, said cooling chamber being provided with means for quickly cooling said metal.

HARRY O. BREAKER.